July 22, 1958     B. BARSHAY     2,844,785
PRECISION RESISTOR NETWORK
Filed April 2, 1956
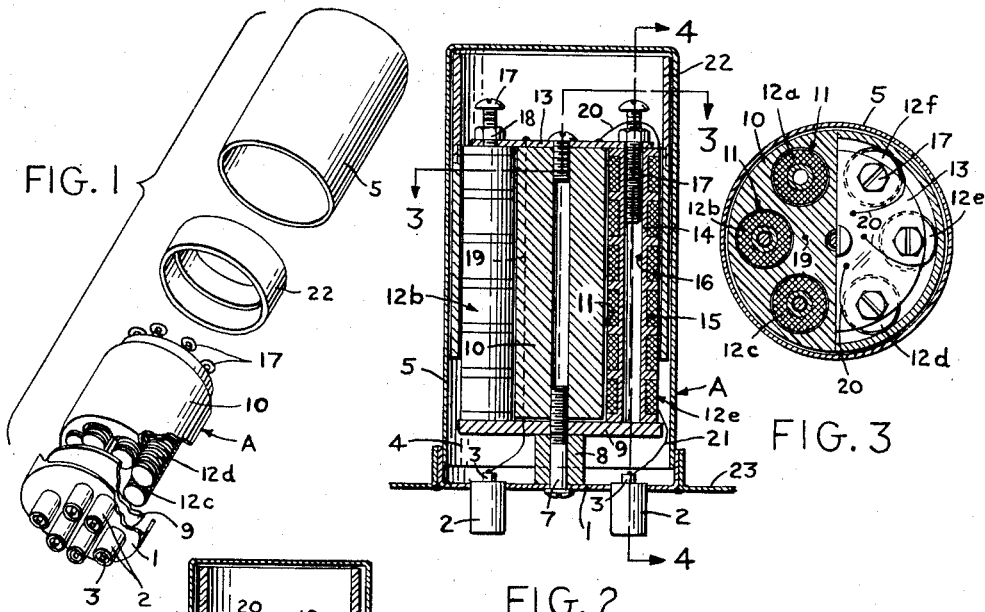
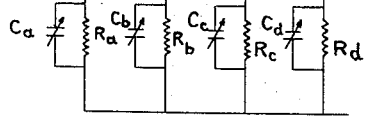
BERNARD BARSHAY
*INVENTOR.*

United States Patent Office 2,844,785
Patented July 22, 1958

2,844,785
PRECISION RESISTOR NETWORK

Bernard Barshay, Elizabeth, N. J., assignor to The Daven Company, Livingston, N. J., a corporation of New Jersey Application April 2, 1956, Serial No. 575,414

7 Claims. (Cl. 323—74)

This invention relates generally to resistor networks and more particularly to a precision resistor network in which the magnitude of the residual parameters of each of the resistors in the network is reduced to a predetermined tolerance and the residual parameters bear a predetermined ratio to each other whereby the unit may be utilized without the necessity of auxiliary precision adjusting apparatus.

In apparatus having frequencies of 5,000 cycles or lower, that is, in the audio frequency range, it is often necessary to adjust the circuit through the use of several resistances and in particular, in precision network application, where the resistances are used relative to each other, it is necessary that the reactances bear the same relative relation to each other whether operating on an A. C. or D. C. circuit or the values assigned to the resistances and measurements made with different resistors in the network will be inaccurate. Stated another way to provide a precision resistor network where the A. C. and D. C. ratio of one resistor relative another are equal, it is necessary that the ratio of the respective effective reactances of each of the resistors to the other is the same as the ratio of their respective resistances.

In order to accomplish this result heretofore, it has been necessary to embody other components in the resistor network for adjusting the network to produce this result and as a consequence, the size of the network was relatively large.

The present invention overcomes this problem by providing a precision resistor network wherein the size of the unit may be relatively small without sacrificing electrical compatibility.

Thus, the present invention covers a precision resistor network which includes in a casing enclosing a member having a plurality of resistors disposed therein with means for adjusting the reactive components of each resistor relative to one preselected resistor in the unit whereby the reactances as produced by the residual parameters of the resistors will bear the same ratio to each other as their respective resistive components.

Accordingly, it is an object of the present invention to provide a precision resistor network which may be manufactured in relatively smaller sizes than heretofore obtainable, with a minimum of auxiliary precision adjusting components and wherein the reactive components are fixed to a predetermined minimum tolerance and are balanced against each other.

It is another object of the present invention to provide a hermetically sealed precision resistor network which is mechanically and electrically stable and hence can withstand the rough usage which might be required in the application of this structure to aircraft, seacraft, rockets, or other like apparatus, and applications.

Further objects and advantages of the invention will become evident from the following description with reference to the accompanying drawings in which:

Figure 1 is an exploded perspective view of one form of the present invention having a fragment thereof broken away to clearly illustrate the relationship of the structure and its elements.

Figure 2 is a vertical section through the precision resistor network shown in Figure 1.

Figure 3 is a top view taken on line 3—3 of the precision resistor network shown in Figure 2.

Figure 4 is a cross-section taken on line 4—4 of Figure 2.

Figure 5 is a partial vertical section showing a modified form of the present invention.

Figure 6 is a partial vertical view showing another form of the present invention.

Figures 7a and 7b are diagrammatic sketches showing some of the electrical configurations possible by use of the precision resistor network generally illustrated in the present invention.

Referring to the drawings, Figures 1, 2, and 3, show a precision resistor network generally designated A as including a header holder or base element 1 having a plurality of circumferentially disposed hermetic seal terminals 2 inwardly of the periphery which extend through the holder 1 to provide connecting terminals 3 in the chamber 4 formed by a casing or tubular cover element 5 which is fastened to the flange 6 about the periphery of the holder 1 by any suitable means such as welding. The air may be withdrawn from the chamber and may be replaced by an inert gas prior to sealing the tubular casing 5 to the flange 6 to provide a hermetically sealed unit. This procedure is well known in the art and hence is not more fully described herein as it did not form part of the invention other than providing the preferred conditions of operation for the present invention.

A centrally disposed pin or screw 7 also extends through the holder 1 into the chamber 4 and provides means for mounting a center post 8 between the header or base element 1 and an end support member 9 which serves to support a resistor holder 10, all of which is clearly shown in Figures 1 and 2 of the drawings.

The resistor holder 10 is a cylindrical member or body with a series of longitudinally disposed bores 11 which extend the full length thereof and thus are open at both ends of the resistor holder so that resistor units 12a, 12b, 12c, 12d, 12e, and 12f, mounted therein will engage the supporting end member 9 at one end. A connector plate 13 attached to the end of the resistor holder 10 remote from the end member 9 engages the other end of each of the resistor elements 12a, 12b, etc., and acts to hold and squeeze the resistor elements between the connector plate 13 and the end member 9.

The resistors may be of any suitable type. However, as a general rule, they will be wire-bound resistors which, as indicated in Figures 2 and 4, would include a bobbin or thimble element 14 having a number of spaced recesses 15 therealong. In this type of wire-wound resistance the wire in adjacent recesses can be wound in opposite directions for purposes which are well known in the art.

Since this type of wire-wound resistance is easily purchasable on the open market it is not described more fully herein, it being understood that any resistance could be utilized in accordance with the present invention without departing from the spirit thereof.

Each of the resistors 12a, 12b, etc., are provided with a bore 16 extending therethrough along the longitudinal axis which bore 16 in all but one resistor, as for example, resistor 15a, receives a capacitor adjusting member 17. The member 17 may be a screw-threaded element mounted in the connector plate 13 with a locking nut 18 provided for holding the capacitor adjusted member in adjusted position, as is shown in Figures 1, 2, 3, and 4.

However, the capacitor adjusting member could also be a rod 17' as shown in Figure 5 which is moved inwardly and outwardly of each resistor element and then connected as be welding or soldering at 18' in its adjusted position or it may be a sleeve element 17" such as is shown in Figure 6 which may be adjusted by reducing the size thereof as desired. In the form of the invention shown in Figures 6 where the external shield 20b is provided, the residual parameters of the resistor is adjusted by the length of the shield which covers the resistor element. It will be understood that these respective adjusting means could also be used in combination where increased capacitance adjustment is required without departing from the spirit of the present invention.

The connector plate 13 is connected by line 19 to one of the terminals 3 in turn communicating with the electrical circuit in which the resistor network is utilized. Each of the resistor elements is connected at one end to this common plate as by their respective connections 20. The other end of the resistors will be connected through the connecting lines 20 on each of the resistors to an independent terminal 3 to provide means for connecting any one or more of the resistors into the circuit in which the precision resistor network is connected, it being understood that each of the resistors may be connected independently of the other or they may be connected in series as is provided in the particular conditions of the system in which the resistor network is utilized.

All the elements shown in Figures 5 and 6 with the exception of the rod 17' and the shield 17" are identical with those above described for the form of the invention shown in Figures 1 to 4 and hence bear the same character numerals. Figure 6 indicates that the resistors may be connected by passing a line 19 through the bore 16' and connecting it by any suitable means to the end member 9 which is in turn connected to one of the terminals 3 communicating with the electrical circuit in which the network will be utilized.

It is also noted that one of the resistors, indicated as resistor 12a, will not have a capacitor adjusting means associated therewith. This resistor is considered the reference for the particular resistor network against which all the resistors will be balanced to obtain the desired results of the present construction. This particular resistor is selected during the adjusting phase of manufacture of the present structure.

In the alternative, it is believed clear that for manufacturing purposes all the resistors could be provided with capacitor adjusting members and each resistor balanced against an independent externally disposed reference resistor chosen because of its low residual parameters, as is described hereinafter.

A shield support 22 is provided which engages the upper end of the resistor holder 10 and provides means for holding the cover element in spaced relation from the capacitor adjusting elements 17. A mounting bracket 23 connected to the flange 6 of the header holder or support 1 will provide means to connect the precision resistor network to the particular apparatus in which it will be utilized.

Adjusting the precision resistor network

Before the present invention becomes operable, it is necessary to adjust the residual parameters of the resistor elements mounted in the resistor holder before the cover element is sealed to the flange 6 as above described. Accordingly, the end plate 9, resistor holder 10, resistors 12a, 12b, etc., and resistor connecting plate 13 are placed in assembled position and connected to their respective terminals. Before the capacitor adjustor elements 17 are in position, as above described, each of the resistors are measured and the resistor in the particular resistor network with the largest capacitive residual parameter (i. e., numerically the smallest capacitive reactance), or in the alternative, a reference resistor having high residual parameters is taken as the reference for the particular precision resistor network unit being adjusted.

The capacitor adjusting members are now placed in position for each of the resistor units to be adjusted and each of the resistors may now be balanced by turning the capacitor adjusting elements into the bore a given distance determined by suitable measuring instruments well known in the art until the residual parameters are adjusted to provide the desired ratio of the reactive residual parameters of each particular resistor to the reactive residual parameters of the other resistors.

After the capacitor adjusting screws 17 are in adjusted position, they may be held in adjusted position either by the locking means 18 or welded as shown in Figure 5 or held in position with the connecting plate as is shown in Figure 6.

Electrical comparison

Figures 7a and 7b illustrate two forms of equivalent electrical diagrams for precision resistor networks disposed in electrical circuits embodying the feature of the present invention.

If $R_0$ represents the predetermined selected standard for the particular precision resistor network, then $R_a$, $R_b$, $R_c$, $R_d$, $R_e$, and $R_f$ represent the remaining resistors in the precision network which have been balanced against the predetermined selected standard.

In order to secure accurate measurement it is intended under the present invention that the ratio of the residual reactive parameters of these resistors shall be equal whether A.-C. or D.-C. current is passing through the circuit.

Thus, by way of example, with D.-C. current the ratio of any two resistors, for example, $R_a$ and $R_b$ can be expressed as follows:

$$\text{Ratio (D.-C.)} = \frac{R_a}{R_b}$$

Where, however, A.-C. current is passed through the resistor the ratio of one resistor to the other now includes the reactive terms $$\pm j \times a; \pm j \times b$$

etc. for each respective resistor $R_a$, $R_b$, etc. (i. e., the residual reactive parameters). If the reactive components for each resistor are so adjusted that the ratio of the reactances as produced by the reactive components are equal to the ratio of the resistor elements, for example resistors $R_a$ and $R_b$, we have $$\text{Ratio } \frac{\pm j \times a}{\pm j \times b} = \text{ratio } \frac{R_a}{R_b}$$

Then $$\text{Ratio (A.-C.) } \frac{R_a}{R_b} = \text{ratio (D.-C.) } \frac{R_a}{R_b}$$

In the present invention the capacitor adjusting elements provide a simple, efficient and compact means for achieving this result.

The purpose of the capacitor adjusting means on each of the resistors is to regulate the position and magnitude of the electrostatic field as this controls the reactive parameters. Thus any means on the respective resistors whether on the outer surface of the resistor or in the bore formed therein and whether of a conductive nature or not will produce such limitation of the electrostatic field and thus accomplish the desired result. The magnitude of the adjustment needed will determine the type of adjusting means utilized for a particular resistor. If a conductor is used it can be a metal rod or a metal sleeve. If a non-conductor is used it can be a glass rod or plastic sleeve or to those skilled in the art it will be understood that combinations of these can be utilized without departing from the spirit of the invention.

Furthermore, the means does not necessarily have to be mechanical. It can, for example, be a liquid disposed in a reservoir formed in the bore extending through the resistor, such as oil, water or an electrolytic fluid.

It will be understood that the invention is not to be limited to the specific construction or arrangement of parts shown but that they may be widely modified within the invention defined by the claims.

What is claimed is:

1. In a precision resistor network to be connected into an electrical circuit carrying audio frequency waves, a plurality of resistors, means for mounting said resistors in spaced relation, terminals to continuously connect said resistor into the electrical circuit, each of said resistors connected at one end to a terminal common to all said resistors, each of said resistors having its respective other end connected to a terminal independently of any other resistors to allow all said resistors to be connected into the electrical circuit at one time relative each other in any predetermined combination, each of said resistors in the network to be adjusted relative to the resistor in said network having the lowest residual reactive components.

2. In a precision resistor network to be connected into an electrical circuit carrying audio frequency waves, a plurality of resistors, means for mounting said resistors in spaced relation, terminals to continuously connect said resistors into the electrical circuit, each of said resistors connected at one end to a terminal common to all said resistors, each of said resistors having its respective other end connected to a terminal independently of any other resistor to allow all said resistors to be connected into the electrical circuit at one time relative each other in any predetermined combination, each of the resistors in said network to be adjusted relative a reference resistor having a predetermined measured low residual reactive component.

3. A precision resistor network to be connected into an electrical circuit carrying audio frequency waves including, a base and a container connected to said base to form a hermetically sealed chamber, a resistor holder and spacer means disposed in said hermetically sealed chamber and connected to said base, a plurality of resistors mounted in spaced relation in said resistor holder and spacer means, terminal means extending through said base into said chamber for continuously connecting said resistors into the electrical circuit, each of said resistors connected at one end to a terminal common to all of said resistors, each of said resistors respectively connected at its respective other end to another independent terminal to allow all said resistors to be connected into the electrical circuit at one time relative each other in any predetermined combination and an independent adjustable means on each of said resistors to adjust its respective residual reactive component, said adjustable means adapted to adjust the respective residual reactive components on each of said resistors whereby said resistors will have the same ratio to each other as the ratio of their relative resistive components.

4. A precision resistor network to be connected into an electrical circuit carrying audio frequency waves including, a base and a container connected to said base to form a hermetically sealed chamber, a resistor holder and spacer means disposed in said hermetically sealed chamber and connected to said base, a plurality of resistors mounted in spaced relation on said resistor holder and spacer means, terminal means extending through said base into said chamber for continuously connecting said resistors into the electrical circuit, each of said resistors connected at one end to a terminal common to all said resistors, and each of said resistors connected at its respective other end to a respective independent terminal to allow all said resistors to be connected into the electrical circuit at one time relative to each other in any predetermined combination, means providing a reference resistor to which the residual reactive components of said plurality of resistors may be adjusted, and independent adjustable means on each of said resistors to adjust the respective residual reactive components of said resistor to the reference resistor whereby the respective reactive components of each resistor will have the same ratio to each other as the ratio of their relative resistive component to that of the reference resistor.

5. In a precision resistor network to be connected into an electrical circuit carrying audio frequency waves, a plurality of resistors, means for mounting said resistors in spaced relation, terminals to continuously connect said resistors into the electrical circuit, each of said resistors connected at one end to a terminal common to all said resistors, each of said resistors having its respective other end connected to a terminal independently of any other resistor to allow all said resistors to be connected into the electrical circuit at one time relative each other in any predetermined combination, adjustable means on each of said resistors to adjust their respective residual reactive components, and means constituting a reference to which each of said resistors can be adjusted by its respective adjustable means.

6. In a precision resistor network to be connected into an electrical circuit as claimed in claim 5 wherein the adjustable means on each of said resistors comprises a rod type element disposed to be longitudinally adjusted relative the medial portion of its respective resistor.

7. In a precision resistor network to be connected into an electrical circuit as claimed in claim 5 wherein the adjustable means on each of said resistors comprises a sleeve-type element disposed for longitudinal adjustment about the periphery of its respective resistor.

References Cited in the file of this patent

UNITED STATES PATENTS

| | | |
|---|---|---|
| 2,223,585 | Tarpley | Dec. 3, 1940 |
| 2,518,225 | Dorst | Aug. 8, 1950 |
| 2,680,225 | Stevens | June 1, 1954 |